US009409794B2

(12) United States Patent
Wawrla et al.

(10) Patent No.: US 9,409,794 B2
(45) Date of Patent: Aug. 9, 2016

(54) WATER FILTER DEVICE HAVING ENCODING STRUCTURE

(71) Applicant: AQUIS WASSER-LUFT-SYSTEME GMBH, LINDAU, Zweigniederlassung Rebstein, Rebstein (CH)

(72) Inventors: Andreas Wawrla, Widnau (CH); Roland Scholz, Balgach (CH)

(73) Assignee: AQUIS WASSER-LUFT-SYSTEME GMBH, Lindau, Zweigniederlassung Rebstein, Rebstein (CH)

(*) Notice: Subject to any disclaimer, the term of this patent is extended or adjusted under 35 U.S.C. 154(b) by 734 days.

(21) Appl. No.: 13/815,586

(22) Filed: Mar. 12, 2013

(65) Prior Publication Data

US 2013/0220909 A1 Aug. 29, 2013

Related U.S. Application Data

(63) Continuation of application No. 12/311,108, filed as application No. PCT/EP2007/007742 on Sep. 5, 2007, now Pat. No. 8,394,269.

(30) Foreign Application Priority Data

Sep. 20, 2006 (DE) ........................ 10 2006 044 744

(51) Int. Cl.

| | |
|---|---|
| ***B01D 35/147*** | (2006.01) |
| ***B01D 35/30*** | (2006.01) |
| ***C02F 1/00*** | (2006.01) |
| ***C02F 9/00*** | (2006.01) |

(52) U.S. Cl.

CPC .............. *C02F 1/003* (2013.01); *B01D 35/147* (2013.01); *C02F 9/005* (2013.01); *B01D 2201/16* (2013.01); *B01D 2201/302* (2013.01); *B01D 2201/4046* (2013.01); *C02F 2201/002* (2013.01); *C02F 2201/003* (2013.01); *C02F 2201/006* (2013.01); *C02F 2301/043* (2013.01)

(58) Field of Classification Search

None

See application file for complete search history.

(56) References Cited

U.S. PATENT DOCUMENTS

| | | | |
|---|---|---|---|
| 3,334,754 | A | 8/1967 | Kudlaty |
| 4,515,692 | A | 5/1985 | Chandler et al. |
| 5,174,337 | A | 12/1992 | Dahlen et al. |
| 5,486,288 | A | 1/1996 | Stanford et al. |
| 5,693,219 | A | 12/1997 | Beauchamp |
| 5,705,067 | A | 1/1998 | Sumi et al. |
| 5,826,854 | A | 10/1998 | Janvrin et al. |

(Continued)

FOREIGN PATENT DOCUMENTS

| | | |
|---|---|---|
| DE | 199 58 648 A1 | 6/2001 |
| DE | 103 53 424 A1 | 6/2005 |

(Continued)

*Primary Examiner* — Krishnan S Menon

(74) *Attorney, Agent, or Firm* — Breneman & Georges

(57) ABSTRACT

The present invention relates to a water filter device comprising a filter head with filter head components, a replaceable filter candle with filter candle components, and an encoding structure which is formed between a filter head component and a filter candle component. Said water filter device is distinguished, in a first embodiment, in that an encoding structure is formed with axial orientation on an end face of the filter candle and/or on an element which is associated with such an end face of the filter candle. In a second embodiment, said water filter device is distinguished in that an encoding structure is formed separately from a fixing structure.

24 Claims, 7 Drawing Sheets

1 2 3 4 5 6 7 8 9 10 11 12 15 22

(56) References Cited

U.S. PATENT DOCUMENTS

Figure 1:
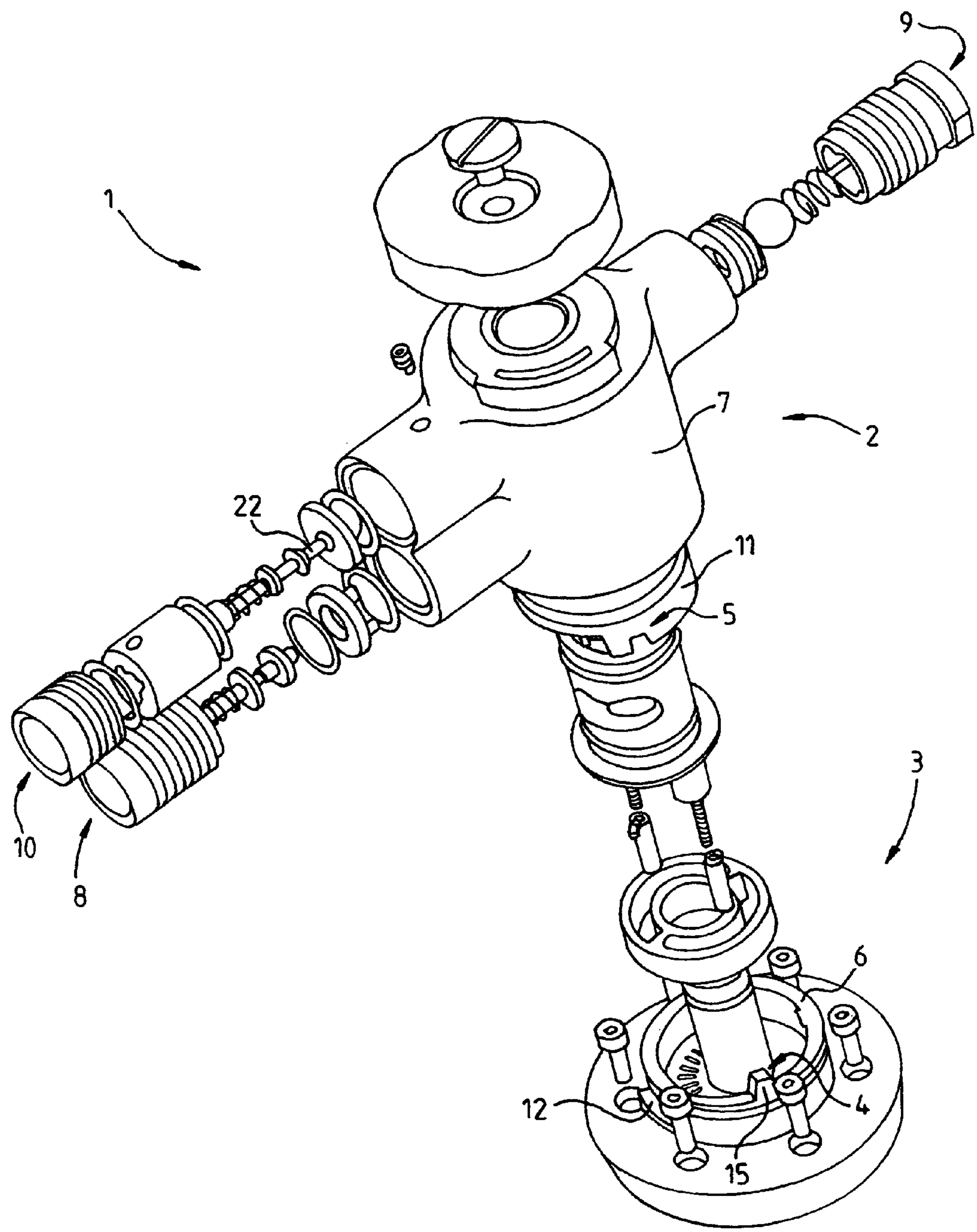

| | | | |
|---|---|---|---|
| 6,458,269 | B1 | 10/2002 | Bassett et al. |
| 6,923,910 | B2 | 8/2005 | McGibbon |
| 6,949,189 | B2 | 9/2005 | Bassett et al. |
| 7,517,449 | B2 | 4/2009 | Choi et al. |
| 7,837,876 | B2 | 11/2010 | Ye et al. |
| 2006/0054547 | A1 | 3/2006 | Richmond et al. |

FOREIGN PATENT DOCUMENTS

| | | | |
|---|---|---|---|
| EP | 0 442 365 | A2 | 8/1991 |
| EP | 0 532 161 | A1 | 3/1993 |
| EP | 1 674 143 | A1 | 6/2006 |
| EP | 1 693 098 | A1 | 8/2006 |
| JP | 09 174050 | A1 | 7/1997 |
| WO | WO 01/80967 | A1 | 11/2001 |
| WO | WO 02/053258 | A1 | 7/2002 |
| WO | WO 02/076575 | A2 | 10/2002 |
| WO | WO 2004/007374 | A1 | 1/2004 |
| WO | WO 2005/011831 | A2 | 2/2005 |
| WO | WO 2006/016924 | A1 | 2/2006 |
| WO | WO 2006/050114 | A1 | 5/2006 |
| WO | WO 2006/091557 | A2 | 8/2006 |
| WO | WO 2008/034523 | A1 | 3/2008 |

WATER FILTER DEVICE HAVING ENCODING STRUCTURE

The present invention relates to a water filter device as claimed in the preamble of claim 1.

PRIOR ART

In order to the treat drinking water in private households and in the catering trade, it is known to use water filters as a central or decentralized installation for feeding extraction points and specifically for feeding modern kitchen appliances, for example coffee machines, taps and ice makers (for example in modern refrigerators), and furthermore in the commercial sector for feeding beverage machines for providing cold and hot beverages, dishwashers and steam cookers for the purpose of optimizing the taste of the beverages and food treated or prepared with said water, and for protecting the machines against water-related technical problems.

In general, such water filter devices comprise a filter head and filter head components associated with said filter head and also a replaceable filter candle with filter candle components which are associated with said filter candle. In order to prevent combination of filter heads and filter candles which do not match or are not intended for one another, it is possible, for example, to provide an encoding arrangement between two such units.

In this respect, the prior art provides, for example, U.S. Pat. No. 6,458,269 B1 and U.S. Pat. No. 6,949,189 B2.

PROBLEM AND SOLUTION

The present invention is based on the problem of improving a water filter in accordance with the type described in the introduction.

This problem is solved by claims 1 and 2. Further advantageous and expedient embodiments are provided by the subclaims.

Accordingly, the present invention relates to a water filter device comprising a filter head with filter head components, a replaceable filter candle with filter candle components, and an encoding structure which is formed between a filter head component and a filter candle component. Said water filter device is distinguished, in a first embodiment, in that an encoding structure is formed with axial orientation on an end face of the filter candle and/or on an element which is associated with such an end face of the filter candle.

A design of this type provides considerably greater structural freedom compared to the prior art known to date. In particular, this design makes it possible to form the region of the encoding structure, as viewed from outside, downstream of a sealing means for the untreated-water inflow region, that is to say, for example, downstream of a corresponding O-ring. A further advantage of this procedure is that, on account of the associated lower radial expansion, a correspondingly designed filter candle requires less space and, at the same time, can be inserted more easily and readily into the head.

An embodiment of this type also advantageously provides considerably more degrees of freedom with regard to the manner in which the filter candle is attached to the head. Therefore, means for clamping, clipping, gripping, possibly magnets and/or the like, are feasible for attachment purposes for example, said means having to be arranged, for example, not only in the manner of a bayonet fitting on an outer neck region of the filter candle but, conversely, can also be arranged entirely in an end-face region of the filter candle, so that they can interact with correspondingly complementary contours in the interior of the filter head. However, attachment options which surround the filter head on the outside are also feasible.

These advantages cited here furthermore also apply to a second possible embodiment of the present invention which is distinguished in that an encoding structure is formed separately from a fixing structure. A fixing structure of this type is understood to be the elements which are provided for fastening a filter candle in a corresponding filter head, for example a bayonet fitting or the like.

In both embodiments, it is considered advantageous when the encoding structure is in the form of a tooth system, in particular in the form of an axially oriented tooth system. A tooth system of this type provides the advantage of two complementary encoding structures engaging simply and reliably one in the other, with a large number of different encoding types at the same time being provided with one and the same encoding system by combining a plurality of individual tooth system structures which differ from one another.

The encoding structure can thus have, for example, a tooth system with teeth which have a specific angular relationship with one another. For example, it is possible, as seen in a plan view of an end-face arrangement of this type, to arrange a specific number of teeth in specific angular segments in an imaginary full circle. The orientation of one or more such teeth, for example so as to point away from the filter candle or to point toward the filter candle, that is to say as an indentation in the filter candle and as a tooth on a corresponding filter head element, can provide further variation for distinguishing from other encoding structures with simple means, given the same number and position of teeth of the relevant tooth systems of the encoding structure. In particular, no undercuts are required in corresponding injection molds in superstructures of this type in order to produce the respective components, and in this way reduce the related expenditure.

In addition to individual tooth systems which are oriented differently, so as to point away from the filter candle, that is to say with the corresponding accommodating indentation in a filter head element which is associated with the filter head, or conversely oriented so as to point toward the filter candle, that is to say the tooth is formed on a filter head component and the correspondingly complementary indentation is formed in the filter candle, provision may also be made, in order to increase the encoding variability, for combined orientation of teeth of the tooth system, in which both the embodiment in which the teeth point away from the filter cartridge and the embodiment in which the teeth point toward the filter cartridge can be realized. However, as before, it is true for all these embodiments of encoding structures that they are formed so as to be oriented axially to an end face of the filter candle and/or separately from a fixing structure.

The same also applies to further embodiments which are proposed here and in which, for example in order to further multiply an encoding structure, it is proposed that a different length and/or size is provided for various teeth. A different number of teeth for various encoding designs is also highly suitable for forming different encoding structures. This also applies to a different number of teeth in specific angular segments.

It is further considered particularly advantageous when the encoding structure is in the form of an actuating element for a filter head component. In this case, it is possible, for example, for one tooth, but for all intents and purposes also for a plurality of teeth, to be provided as a corresponding actuating element for engaging in a complementary recess, in order to operate, for example, a valve body or the like, for example during the process of mounting the filter candle on the head or removing the filter candle from the head. In the event of a rotary movement which may be provided for this purpose, the tooth could, for example, operate the valve body by means of correspondingly provided engagement in the event of the respective rotary movement from a closed position to an open position or, again conversely, from an open position to a closed position for the respective valve.

However, in the event of an axial relative movement, which may be provided, of the filter candle relative to the filter head for the purpose of fixing the filter candle to the filter head or for removing the filter candle from the filter head, an axial movement of the valve body for operating one or more valves which are formed therein is also feasible. The valve body could be axially inserted, for example, against a spring force or the like. The axial return process can then be performed, for example, in a manner induced or at least assisted by this spring force. Further actuating and/or attachment means would be conceivable, for example, by forming corresponding snap-action or clamping connections.

These actuating and/or attachment means can be activated or deactivated, given corresponding positioning of the valve body, for example by virtue of a resistance, which is built up by a correspondingly formed mating and/or stop face, against the displacement movement created by the mounting or removal of the filter candle.

A further operating option for such a valve body could be provided, for example, by combining an axial movement and a rotary movement, for example created by two faces which run obliquely to one another, preferably aligned with one another under prestress. Therefore, in the event of an axial displacement movement of the filter candle over two complementary, oblique faces, a rotary movement could take place on a valve body, which is provided with one of the two oblique faces and is in the form of a rotary valve, for activating or deactivating one or more valves which are formed on this valve body.

Possible valves which are formed on such a valve body would be, for example, an inlet valve, an outlet valve, a relief valve, a flushing valve or else a bypass valve and/or a combination of individual or a plurality of such valves. The inlet valve may serve, for example, as an inflow control means for an untreated-water stream into the water filter device, in which it is ensured, for example, that untreated water is supplied to the filter device only when precisely that filter candle for which the corresponding encoding is provided is inserted in the filter head. This supply of the untreated water is immediately interrupted, by deactivating the inlet valve, when the filter candle is removed from the head. A similar or identical control means can also be provided for an outlet valve, so that the water which has already been filtered and is located in a discharge line of the water filter device which may possibly lead upward cannot flow out downward through the corresponding outlet opening and the head after removal of the filter candle.

A relief valve could, for example, have the function of making it possible to reduce the water pressure prevailing in the interior of the water filter device, in the event of the connection mechanism between the filter candle and the filter head being opened, by briefly opening this relief valve. This generally small quantity of water is preferably conducted to a correspondingly suitable point via a line which is specifically intended for this. In this case, said line may particularly advantageously be a line which is connected to a possibly additional existing flushing valve for flushing the filter candle when it is first inserted into the filter head.

In a particularly preferred embodiment, the relief valve and the flushing valve can even be realized by a single valve which, by means of corresponding actuation during the mounting or removal process, ensures that the relevant process is carried out.

When mounting the filter candle, provision may be made, for this purpose, for, for example, a relatively long open position of this valve, so that a relatively large quantity of supplied untreated water is washed through the filter candle and again is discharged via the abovementioned discharge line via the flushing valve such that it passes by the outlet. It is particularly advantageous here when the outlet valve for this control time point or for this control position of the filter candle is closed, so that water is forcibly discharged via the flushing valve.

In order to relieve the water pressure prevailing in the interior of the water filter device when the filter candle is removed, for example after it is depleted, a brief pulse for opening and an associated reduction in the water pressure prevailing therein, for example in a manner controlled by a correspondingly formed control projection, is sufficient in contrast. However, in order to control the flushing valve, a control projection may also be provided, but this should have a correspondingly longer profile for actuating the valve, and so this projection can optionally also be called a control cam.

The bypass valve could be provided, for example, for connecting a further water filter device to this first water filter device. Said bypass valve could likewise be actuated, for example, by mounting or removal of the filter candle in the sense that, when the filter candle for the first water filter device is removed, the bypass valve serves to supply the second water filter supply which is connected to the bypass valve, and, conversely, when a filter candle is inserted, the water supply is possibly again interrupted by this bypass valve.

However, further and/or additional opening of this bypass valve is also feasible, for example by an adjusting mechanism which is to be operated separately and allows a changeover to be made between this water filter device and one which is connected to the bypass valve, in order, for example, to ensure water is further supplied to a load which is connected to the water filter devices, despite a filter candle being removed from one of the two water filter devices.

It is also considered advantageous when a setting device for setting a partial-flow ratio between at least two flow paths of an untreated-water stream is provided, with at least one flow path particularly preferably comprising a filter section. A water filter device of this type may contain, for example, softening/decarbonizing/demineralizing systems based on interchangeable filter candles and, possibly for setting a water quality which is predetermined for the respective use, a blending device can serve the purpose of coordinated mixing of water treated via the filter section with water which has not been filtered or has been conducted over a different water treatment medium.

A particularly elegant option for influencing the process is provided when the setting device comprises an untreated-water distribution element and a complementary partial-flow channel guide element. In this case, the untreated-water distribution element may be designed, for example, as a ring or disk with recesses and/or covers arranged therein for influencing the passage of a corresponding untreated-water stream. The complementary partial-flow channel guide element may comprise, for example, access openings to corresponding untreated-water stream feed lines for various water sections, for example for a filter section for filtering the untreated-water stream, for a bypass section for admixing water which has not been treated or has been treated in some other way to the filtrate stream, for a water section to a possibly provided further water filter and/or the like.

The partial-flow channel guide element is preferably arranged or formed in or on the filter cartridge for this purpose. The untreated-water distribution element is again preferably arranged in or on the filter head, so that the setting device comprises two complementary elements, of which in each case one is associated with the filter candle and one is associated with the filter head in a manner which reduces the manipulation options.

In an embodiment which is modified in comparison to the above, the untreated-water distribution element may, however, also be associated with the filter candle, so that it is part of a filter-candle replacement set.

However, it is possible for both embodiments for the untreated-water distribution element to be in the form of an exchangeable element, in order, for example, to provide a water-filter device system which is as open as possible. It is therefore possible, for example, for various application cases to realize different water treatments, possibly by using filter candles of different construction or else by different actuation, in particular by different application, of individual partial flows.

The partial-flow setting can be influenced, for example, by a positioning unit, which is provided in the filter head, for the untreated-water distribution element, said positioning unit in particular advantageously being lockable, for example in order to prevent unintentional adjustment of the untreated-water distribution during operation of the filter.

A further advantage of such locking is that it is possible to adjust the untreated-water stream distribution even during operation of the filter candle by means of the positioning unit, specifically both with regard to a possible increase in the percentage flow rate, for example to the filter section and a possibly associated reduction in the flow rate to a bypass section and vice versa, in order to preferably be able to maintain the internal pressure in the filter system substantially independently of such a blending setting.

However, in an embodiment which is simpler than the above, it is also feasible for only one of the partial flows described above by way of example to be influenced in order to influence a specific mixing ratio between the filtrate stream and bypass stream and/or a further water stream which may be provided.

Accordingly, the total cross section of the partial-flow channel guide element which is formed from the sum of the two partial flows and is effectively opened by the untreated-water distribution element is, depending on the embodiment, substantially the same size at all blend settings or differs in size at different blend settings.

EXEMPLARY EMBODIMENT

Figure 2:
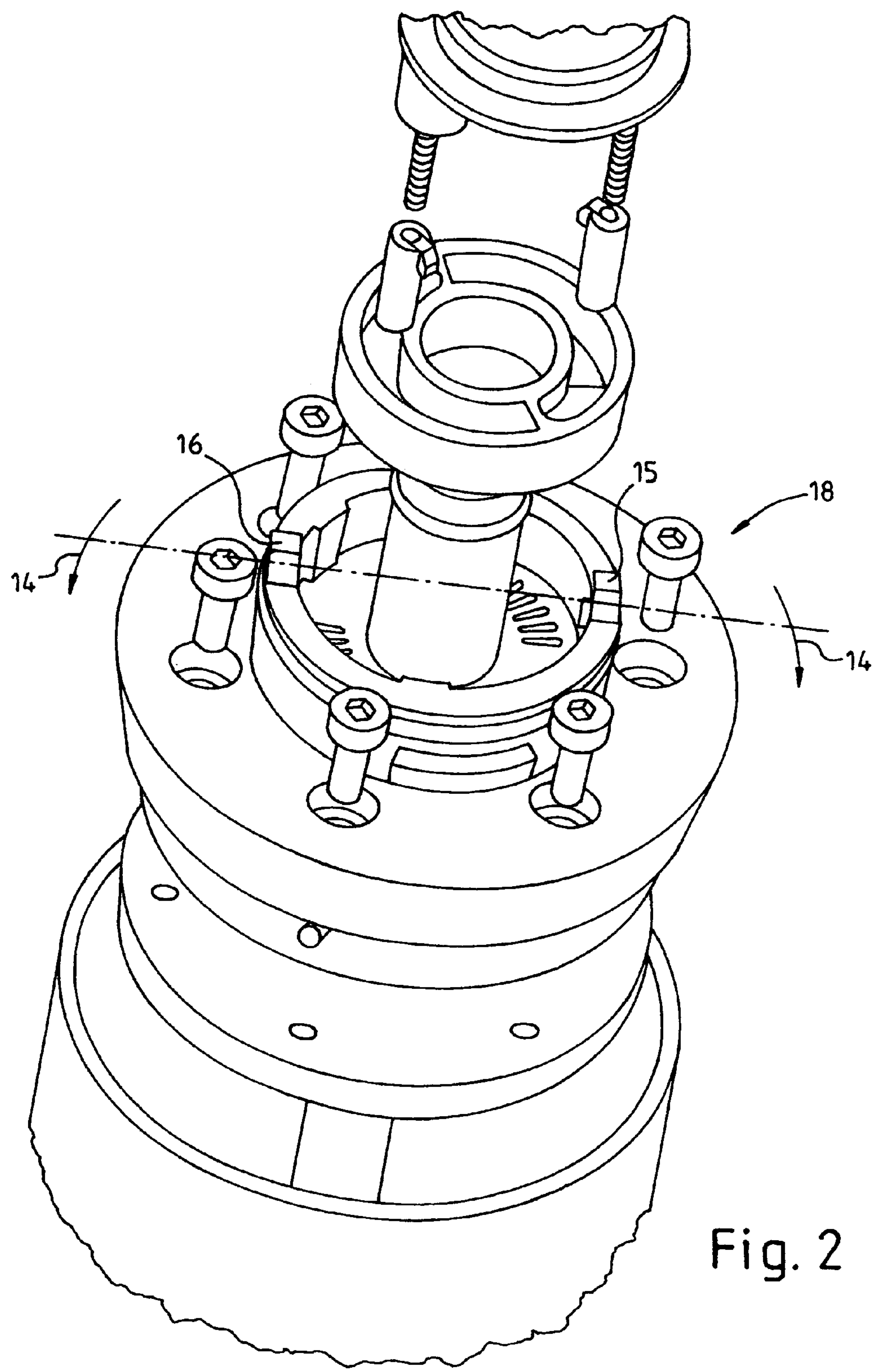
Figure 6:
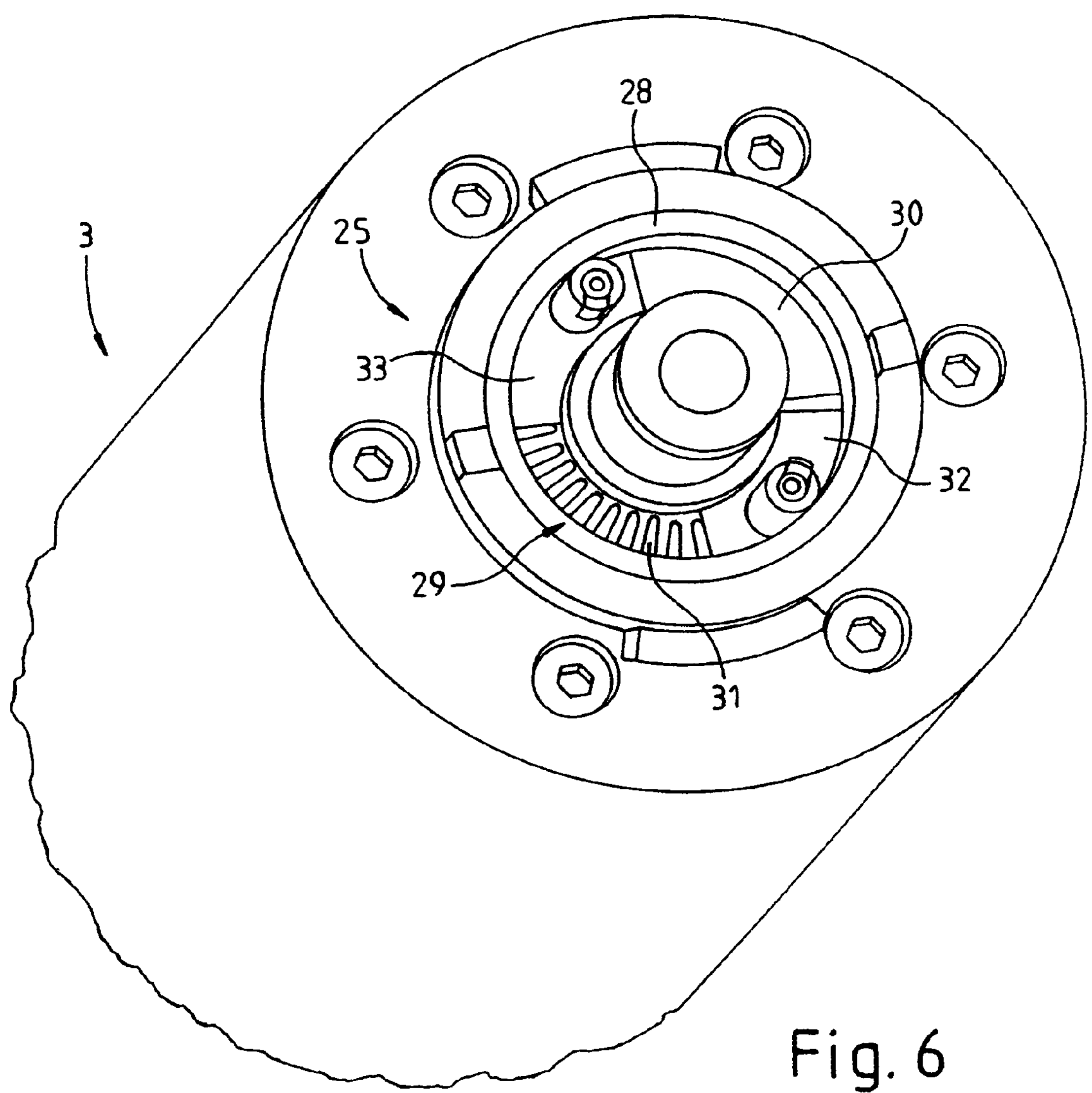
Figure 7:
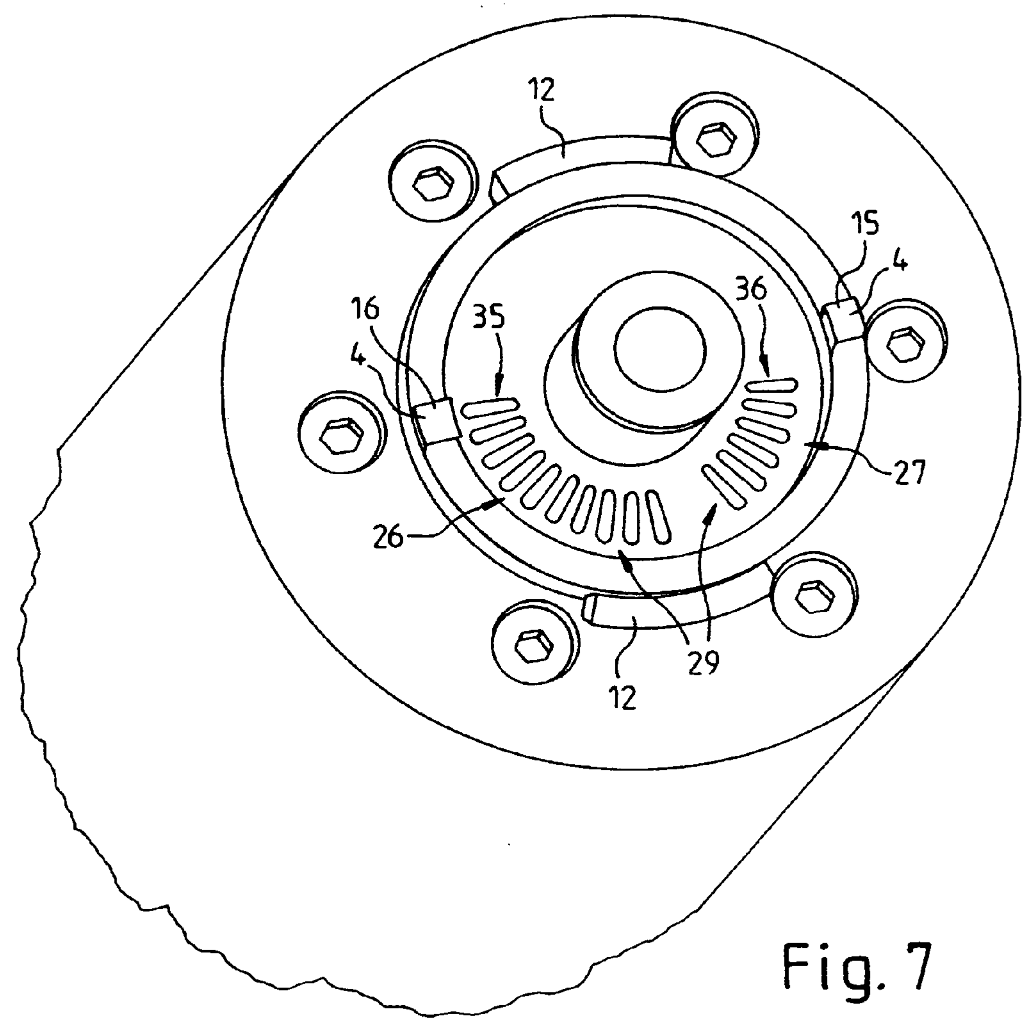

The present invention is explained in greater detail below with reference to the attached figures and the description which refers to said figures, in which:

FIG. 1 shows a schematic perspective plan view of an exemplary, exploded illustration of a water filter device with an encoding element, FIG. 2 shows an enlarged illustration of a detail from FIG. 1, FIGS. 3 to 5 show further exemplary, schematic views of individual elements of the water filter device according to the preceding figures, and FIGS. 6 and 7 show two further exemplary plan views of a filter candle, with and without an untreated-water distribution element.

FIG. 1 accordingly shows, by way of example, a perspective plan view of a water filter device 1 with a filter head 2 and a replaceable filter candle 3. The filter head comprises a plurality of filter head components, the housing 7, an inlet valve 8, an outlet valve 9 and also a relief and/or flushing valve 10 and also an encoding structure 5. A complementary encoding structure 4 is associated with the filter candle. These encoding structures 4, 5 are provided to ensure that only permissible combinations of filter heads and filter candles are possible.

To this end, provision is made for the encoding structure 4 to be formed on the end face 6 of the filter candle 3 in the axial direction. In the present exemplary embodiment here, this encoding structure 4 constitutes, by way of example, a tooth which engages in a corresponding complementary recess 5 in a filter head component 11. The filter candle in question can be mounted in the filter head only when that element of the encoding structure 4 which is associated with the filter candle 3 matches that element of the encoding structure 5 which is associated with the filter head component 11.

In addition to this embodiment, an embodiment which may be modified compared to the above is also conceivable, in which embodiment the encoding structure 4 is formed on an element which is associated with the end face 6, likewise with axial orientation. An element of this type could be, for example, a ring which is to be placed on the end face 6, a disk or the like, which one corresponding connection to the filter candle is suitable for realizing an encoding structure of this type or its function.

A possible connection between such a filter candle element and the filter candle would, for example, be a screwed connection, an adhesively bonded connection, a clip and/or a snap-action closure or the like.

However, such an intermediate element would, in principle, also be perfectly feasible in conjunction with the filter head, likewise with a corresponding mechanical connection.

As a further essential feature, a partition is provided between the encoding structure 4, 5 and the fixing structure 12 for attaching the filter candle 3 to the filter head 2. In this case, the fixing structure 12 is in the form of a bayonet fitting 12 which, when the filter candle is inserted into the head 2, forms a corresponding connection with the housing 7, so that the head and the candle form a corresponding water filter device 1 when the filter candle 3 is in the fixed state.

Figure 3:
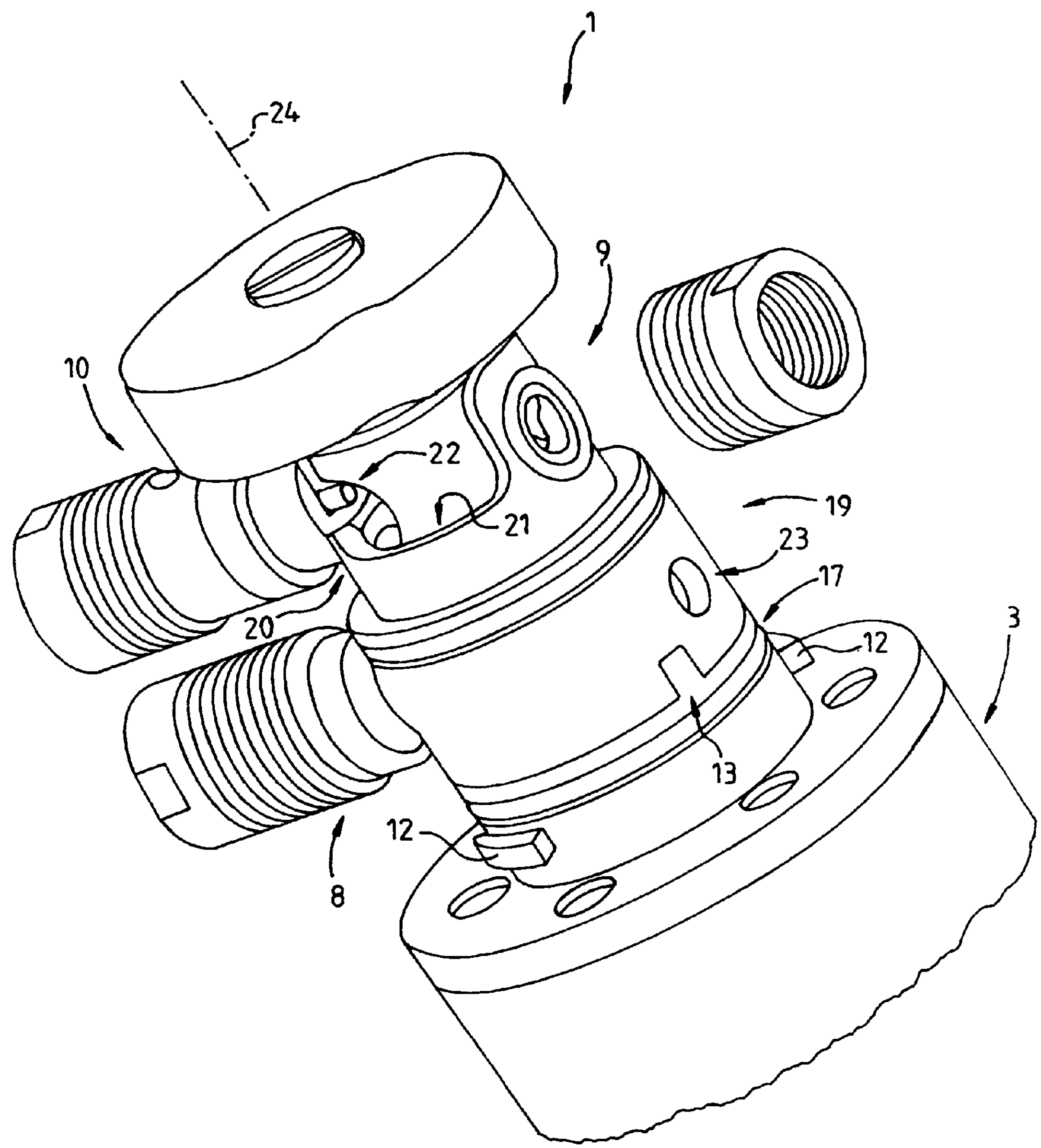

The two encoding structures 4, 5 therefore form a tooth system in which, when a plurality of teeth are provided, these teeth have a specific angular relationship 14 with one another, as illustrated, for example, in FIG. 2, with an offset of 180°. In the illustrations of FIGS. 1 to 3, the tooth 5 has a formation 4 which points away from the filter candle 3 and engages in a complementary recess 5 in the filter head component 11. However, in an embodiment which is modified compared to the above but is not illustrated by way of example, it is also feasible for a tooth 15 of the tooth system to be formed, for example, on a filter head component 11 and to engage in a correspondingly complementary recess in a manner pointing toward the filter candle 3. A combined formation of such differently oriented teeth so as to point away from the filter candle 13 and to point toward the filter candle 3 is also possible and expands the possible spectrum of encoding arrangements.

A further addition in this respect may be realized, for example, by a radial offset of individual teeth or a plurality of teeth relative to one another, but always with axial orientation relative to an end face 6 of the filter candle 3. By means of this axial orientation of the encoding structures 4, 5 in relation to an end face 6 of the filter candle 3, it is possible to realize, for example, smaller designs since structures which are otherwise required radially on the outside of the filter candle or on the neck of said filter candle can be dispensed with.

A further advantage of an embodiment of this type can be found in the ability to insert the filter candle more simply and readily on account of smaller and more compact structures. In addition, it is possible to arrange the encoding structure within the sealing region, downstream of a corresponding untreated-water inflow seal which is realized, for example, in the form of an O-ring 17, this also being attributed, in particular, to the separate formation of the fixing structure 12 and the encoding structures 4, 5.

Additional expansion of the encoding options is produced by the different formation of the teeth with regard to their length and/or their size, but also with regard to a different arrangement and number of teeth, as are illustrated here, by way of example, by the two teeth 15, 16 in FIG. 2. In an embodiment which is modified compared to the above, 3, 4 or any other desired number of teeth, which can be arranged on the end face 6 of the filter 3, could also be provided. In the illustration of FIG. 2, the angular segment 18 is fitted here, by way of example, only with a single tooth. However, in an embodiment which differs from this, the number of teeth may well also be higher.

Furthermore, it is considered particularly preferable when the encoding structure 4, 5 is in the form of an actuating element for a filter head component 11, for example in the form of a valve body 9, as illustrated in FIG. 3. This valve body 19 in FIG. 3 differs from the embodiment in the valve body in FIG. 1 in that it is in the form of a rotary valve body. The valve bodies shown in FIG. 1 are, in contrast, illustrated as tappet valves by way of example.

In the illustration of FIG. 3, an inlet valve 8 and an outlet valve 9 are illustrated in a manner formed on the valve body 19 by way of example. A further possible arrangement of a valve on this valve body 19 is shown by the relief valve 10 and/or the flushing valve 10 which in the present case is realized by a single valve.

The inlet valve serves to control the inflow of untreated water and the outlet valve serves to control the filtrate stream. The relief valve serves to reduce the pressure prevailing in the interior of the water filter device before the exchangeable filter candle is removed, preferably via a line (not illustrated here) which is accordingly provided for this purpose. The flushing valve 10 which is simultaneously realized by this serves to flush the replacement filter when it is inserted into the filter head, so that any impurities which may be present therein can be flushed out and likewise disposed of via this outlet line.

In order to control the relief valve 10 or the flushing valve 10, the valve body 19 may comprise a control cam 21 or a control projection 20 which is operated in order to correspondingly actuate the relevant valve at the respective operating time or in order to set the relative position of the exchangeable filter candle 3 in relation to the filter head 2.

In the illustration of FIG. 3, a valve tappet 22 is shown for this purpose, said valve tappet also being denoted by the number 22 in FIG. 1 for reasons of simplicity. The manner of operation of the relief valve or flushing valve 10 shown in FIG. 1 is correspondingly the same as that of the valve 10 shown in FIG. 3. In this case, said valve, in contrast to the inlet or outlet valve, is therefore not a rotary valve but a cam and/or projection-operated tappet valve. Depending on the desired function, said tappet valve can be actuated or operated in order to perform its function relatively briefly.

If desired, the valve body 19 may also be provided, for example, with a further valve 23, for example in the form of a bypass valve, for example in order to provide a corresponding connection for a further unit. A further unit of this type could be, for example, an additional water filter device which can optionally be connected parallel to this water filter device in order to optionally permit a changeover to be made to a second water filter device when the filter candle of the first water filter device should be depleted. FIG. 3 additionally clearly shows the separate design of the encoding structure 4, 5 from the fixing structure 12 which is illustrated here in the form of a bayonet fitting.

Figure 4:
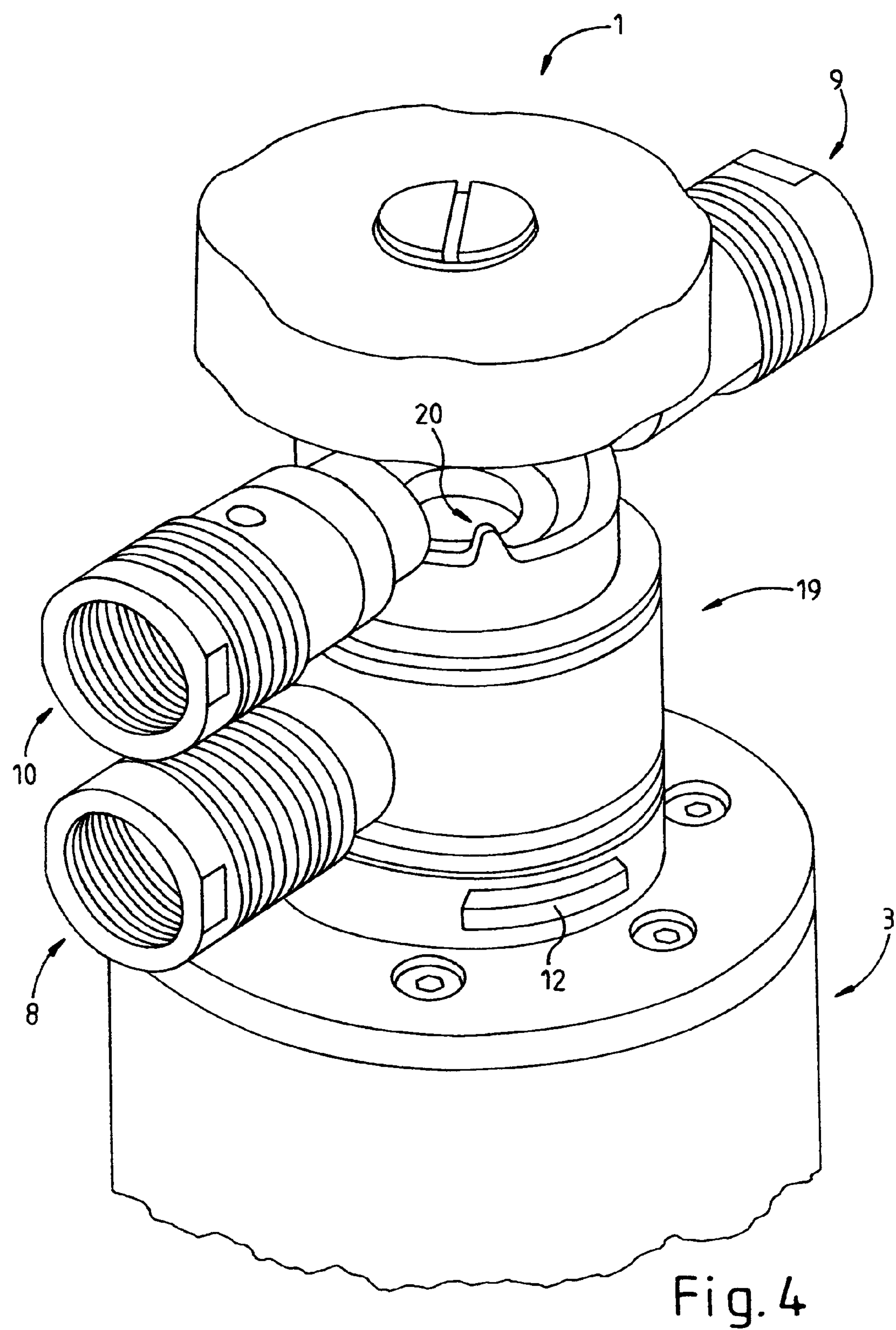
Figure 5:
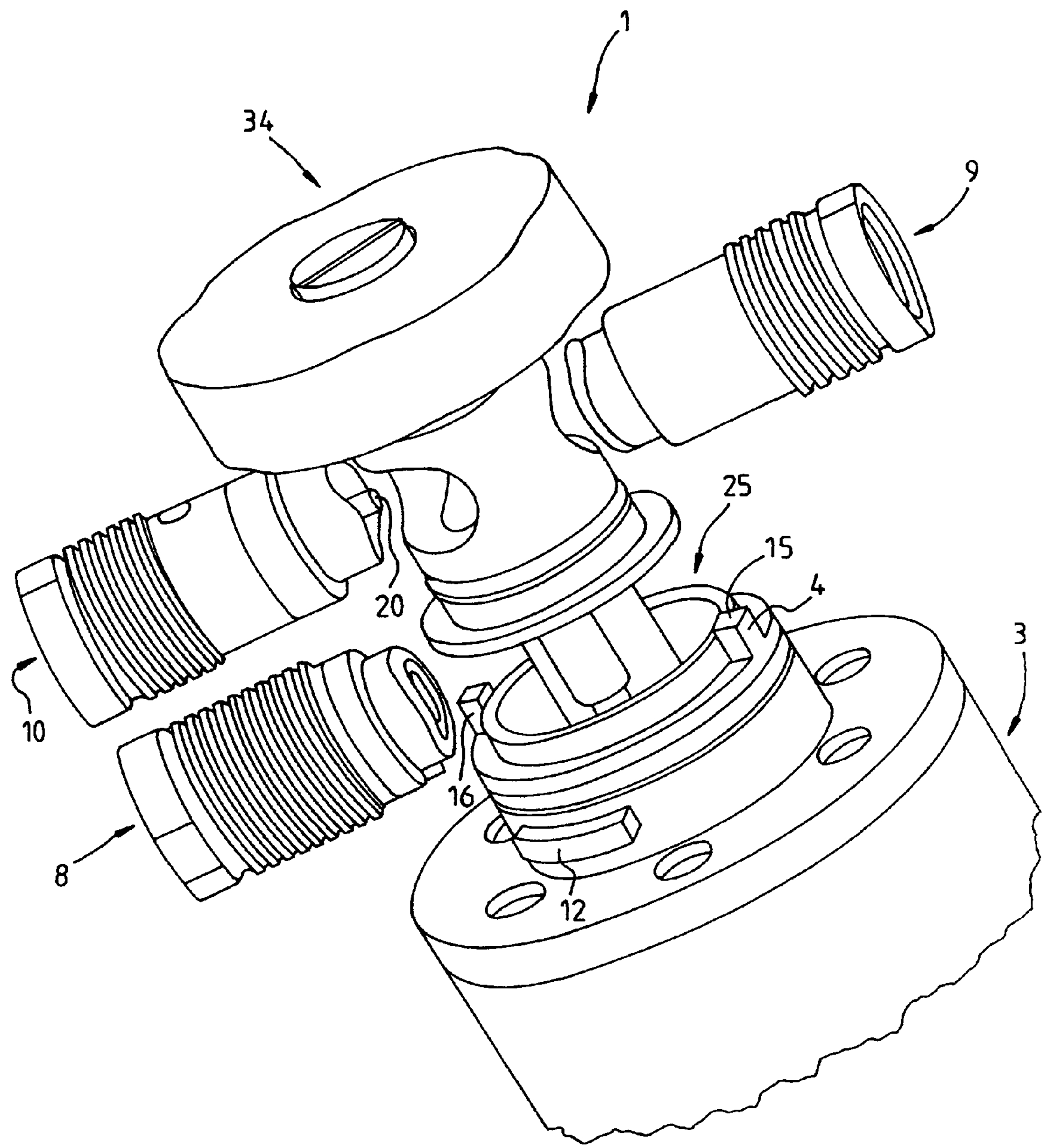

In contrast, FIG. 4 shows an illustration of the same elements of the water filter device 1 rotated along a longitudinal axis 24. Said figure particularly clearly shows the control projection 20 for actuating the relief valve 10 or the flushing valve 10.

FIG. 5 again shows a further illustration of a water filter device, but without a valve body 19 in order to be able to illustrate further elements which are otherwise covered by the valve body. Such a further element of the water filter device 1 is a setting device 25 for setting a partial-flow ratio between at least two flow threads 26, 27 (FIG. 7) of a untreated-water stream which is supplied to the water-filter device 1 through the inlet valve 8. The flow path 26 is conducted through the filter section of the exchangeable filter candle 3 in this case. The flow path 27 is conducted across a so-called bypass section or blending section in order to be able to blend or treat the filtrate stream of the water filter device 1, which filtrate stream is supplied through the flow path 26.

In accordance with the illustration in FIG. 6, the setting device 25 comprises an untreated-water distribution element 28 and a complementary partial-flow channel guide element 29, which can best be seen from the illustration of FIG. 7. In this case, the partial-flow channel guide element 29 comprises the two input openings 35, 36 for the two partial-flow sections, the filter section 26 and the bypass section 27, as elements which are associated with the filter cartridge 3.

The untreated-water distribution element 28 is of annular form by way of example here, has segment-like portions with recesses 30, 31 and covers 32, 33 which, in order to control the untreated-water stream which is supplied via the inlet valve, more or less covers or opens the two flow paths 26, 27, depending on the relative angular position in relation to one another. Therefore, the quality of the water treated by this water filter device 1 can be controlled by means of the ratio between the filtrate stream and the bypass stream, for example by operating a control wheel 34 which is provided for this purpose.

Depending on the embodiment, the untreated-water distribution element 28 and the partial-flow channel guide element 29 can be formed or adjusted relative to one another such that either a total cross section which is of substantially the same size at all blend settings is formed from the sum of the two partial flows or, in another embodiment, a total cross section of the activated partial flows which differs in size depending on the setting is formed. In the case of a predominantly constant total cross section, the internal pressure in the water filter device also remains substantially the same in all blend devices, so that a filter action which is as uniform as possible is therefore also provided over the entire setting range.

LIST OF REFERENCE SYMBOLS

1 Water filter device
2 Filter head
3 Filter candle
4 Encoding structure
5 Encoding structure

6 End face
7 Housing
8 Valve
9 Valve
10 Valve
11 Filter head component
12 Fixing structure
13 Tooth system
14 Angular relationship
15 Tooth
16 Tooth
17 Seal
18 Angular segment
19 Valve body
20 Control projection
21 Control cam
22 Tappet
23 Bypass valve
24 Axis
25 Setting device
26 Flow path
27 Flow path
28 Untreated-water distribution element
29 Partial-flow channel guide element
30 Recess
31 Recess
32 Cover
33 Cover
34 Control wheel
35 Opening
36 Opening

What is claimed is:

1. A water filter device comprising:

(a) a filter head having a first end and a second end and a pressurizable area disposed between said first end and said second end in communication with an inlet valve and an outlet valve in the pressurizable area;

(b) a rotary valve body disposed in said filter head having a first encoding structure to operate the inlet valve and/or the outlet valve disposed in the pressurizable area and a cam disposed in the pressurizable area;

(c) a replaceable filter candle having a second encoding structure to engage said first encoding structure in the pressurizable area in the filter head and operate the rotary valve body entirely within the pressurizable area in the filter head; and (d) a seal disposed on the filter candle intermediate the pressurizable area in the filter head and an end of the replaceable filter candle.

2. The water filter device as claimed in claim 1, further comprising a relief valve and/or a flushing valve disposed in said filter head and operated by said cam.

3. The water filter device as claimed in claim 2, wherein the cam has a cam control and/or a control projection to activate a relief valve.

4. The water filter device as claimed in claim 1, wherein the filter head also has an untreated water distribution element.

5. The water filter device as claimed in claim 1, wherein the replaceable filter candle has a partial-flow guide element.

6. The water filter device as claimed in claim 1, wherein the filter head has at least one untreated-water distribution element and the replaceable filter candle has a partial-flow guide element to set a partial flow ratio between at least two flow paths of an untreated water stream.

7. The water filter device as claimed in claim 1, wherein the filter head has an untreated-water distribution element and a setting device for the untreated-water distribution element.

8. The water filter device as claimed in claim 1, wherein the filter head has at least one bypass valve or an untreated water distribution element and a complementary partial-flow channel guide element.

9. The water filter device as claimed in claim 1, wherein the rotary valve body operates one inlet valve and one outlet valve.

10. The water filter device as claimed in claim 1, wherein the first encoding structure or second encoding structure is an actuating element for the filter head.

11. The water filter device as claimed in claim 1, wherein the first encoding structure or second encoding structure has an axial tooth system.

12. The water filter device as claimed in claim 11 wherein the axial tooth system has teeth which have a specific angular relationship with one another.

13. The water filter device as claimed in claim 1 further comprising a tooth system on said first encoding structure or said second encoding structure with some teeth pointing away from the replaceable filter candle and some teeth pointing toward the filter candle.

14. The water filter device as claimed in claim 1 further comprising teeth of a different length and/or size disposed on said first encoding structure or on said second encoding structure.

15. The water filter device as claimed in claim 1 further comprising teeth of a different number of teeth disposed on said first encoding structure or on said second encoding structure to provide various encoding designs.

16. The water filter device as claimed in claim 1 further comprising a tooth structure on said first encoding structure or on said second encoding structure wherein a different number of teeth is provided in a specific angular segment for various encoding designs.

17. The water filter device as claimed in claim 1, further comprising a fixing structure wherein the second encoding structure is formed separate from the fixing structure.

18. The water filter device as claimed in claim 1, wherein the second encoding structure is disposed on an end face of the replaceable filter candle and has an axial orientation on the end face.

19. The water filter device as claimed in claim 18, wherein the second encoding structure with the axial orientation is disposed on the replaceable filter candle.

20. The water filter device as claimed in claim 1, wherein the first encoding structure or the second encoding structure is an actuating element for the rotary valve body.

21. A water filter head comprising:

(a) a water filter head housing having a first end and a second end and a pressurizable area disposed intermediate said first end and said second end and an inlet and inlet valve and an outlet and outlet valve and a relief valve and/or flushing valve disposed in said pressurizable area of the water filter head housing;

(b) a tappet valve disposed in said pressurizable area of said water filter head housing;

(c) a rotary valve body having an encoding structure to operate said inlet valve said outlet valve and said relief valve and/or flushing valve upon rotation of said rotary valve body by said encoding structure, the encoding structure having a control cam and/or a control projection to operate the tappet valve; and (d) a filter mounting bracket disposed in an unpressurized second end of the water filter head housing to simultaneously rotationally engage and fix a filter candle while said rotary valve body operates said inlet valve, said outlet valve and said relief and/or flushing valve.

22. The water filter head of claim 21 wherein a seal is disposed in the water filter head housing intermediate the rotary valve body and the filter mounting bracket.

23. A water filter head comprising:

(a) a water filter head housing having a first end and a second end and a pressurizable area disposed intermediate said first end and said second end and an inlet and inlet valve and an outlet and outlet valve and a relief valve and/or flushing valve disposed in said pressurizable area of the water filter head housing;

(b) a tappet valve disposed in said pressurizable area of said water filter head housing;

(c) a rotary valve body having a first encoding structure to operate said inlet valve said outlet valve and said relief valve and/or flushing valve upon rotation of said rotary valve body by said encoding structure, the encoding structure having a control cam and/or a control projection to operate the tappet valve;

(d) a replaceable filter candle having a second encoding structure to engage said first encoding structure in the pressurizable area in the filter head and operate the rotary valve body entirely within the pressurizable area in the filter head; and (e) a separate mechanical fixing structure disposed in an unpressurized second end of the water filter head housing to simultaneously rotationally engage and fix a filter candle while said rotary valve body operates said inlet valve, said outlet valve and said relief and/or flushing valve.

24. A water filter device comprising:

(a) a filter head having a first end and a second end and a pressurizable area disposed between said first end and said second end in communication with an inlet valve and an outlet valve in the pressurizable area;

(b) a rotary valve body disposed in said filter head having a first encoding structure to operate the inlet valve and the outlet valve disposed in the pressurizable area;

(c) a cam or a control projection disposed in said filter head in the pressurizable area;

(d) a replaceable filter candle having a second encoding structure to engage said first encoding structure in the pressurizable area in the filter head and operate the rotary valve body entirely within the pressurizable area in the filter head; and (d) a seal disposed on the filter candle intermediate the pressurizable area in the filter head and an end of the replaceable filter candle.

* * * * *